US011860024B2

(12) United States Patent
Fredriksson et al.

(10) Patent No.: US 11,860,024 B2
(45) Date of Patent: Jan. 2, 2024

(54) VALVE ARRANGEMENT FOR A GUIDED WAVE RADAR LEVEL GAUGE

(71) Applicant: Rosemount Tank Radar AB, Mölnlycke (SE)

(72) Inventors: Håkan Fredriksson, Linköping (SE); Mikael Eriksson, Västervik (SE); Christoffer Widahl, Västra Frölunda (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 567 days.

(21) Appl. No.: 17/156,883

(22) Filed: Jan. 25, 2021

(65) Prior Publication Data

US 2021/0262847 A1 Aug. 26, 2021

(30) Foreign Application Priority Data

Feb. 21, 2020 (EP) .................................. 20158774

(51) Int. Cl.
*G01F 23/28* (2006.01)
*G01F 23/284* (2006.01)
*F16K 37/00* (2006.01)

(52) U.S. Cl.
CPC ............ *G01F 23/284* (2013.01); *F16K 37/00* (2013.01)

(58) Field of Classification Search
CPC ....... G01F 23/284; F16K 27/067; F16K 37/00
USPC ........................................................ 342/124
See application file for complete search history.

(56) References Cited

U.S. PATENT DOCUMENTS

| 7,345,622 | B2 | 3/2008 | Edvardsson | |
|---|---|---|---|---|
| 2007/0205781 | A1 | 9/2007 | Eriksson | |
| 2014/0084944 | A1 | 3/2014 | Kienzle et al. | |
| 2014/0266863 | A1* | 9/2014 | Larsson | G01S 7/292 342/124 |
| 2018/0010441 | A1* | 1/2018 | Ramachandran | E21B 47/04 |
| 2018/0010948 | A1* | 1/2018 | Edvardsson | G01S 13/88 |
| 2018/0094964 | A1* | 4/2018 | Eriksson | H03L 7/18 |
| 2018/0292251 | A1 | 10/2018 | Gerhold et al. | |

OTHER PUBLICATIONS

Extended European Search Report from European Patent Application No. 20158774.8, dated Nov. 13, 2020.

\* cited by examiner

*Primary Examiner* — Paul J Gray
(74) *Attorney, Agent, or Firm* — Westman, Champlin & Koehler, P.A.

(57) ABSTRACT

A valve arrangement for a guided wave radar level gauge including a valve housing holding a movable valve element having a through-opening, the movable valve element being configured to be movable between an open position and a closed position. A probe section arranged in the through-opening of the movable valve element. Upper and lower probe sections are located on respective sides of the movable valve element. A spring-loaded connection assembly is configured to form an electrical connection between the upper and the lower probe section via the probe section in the movable valve element when the movable valve element is in an open position.

15 Claims, 6 Drawing Sheets

VALVE ARRANGEMENT FOR A GUIDED WAVE RADAR LEVEL GAUGE

CROSS-REFERENCE TO RELATED APPLICATION

This application claims priority to European Patent Application No. 20158774.8, filed Feb. 21, 2020, the content of which is hereby incorporated by reference in its entirety.

FIELD OF THE INVENTION

The present invention relates to a guided wave radar level gauge. In particular, the present invention relates to a ball valve for sealing a guided wave radar level gauge.

BACKGROUND OF THE INVENTION

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide or transmission line. The probe is generally arranged to extend vertically from the top towards the bottom of the tank.

The transmitted electromagnetic signals are reflected at the surface of the product, and the reflected signals are received by a receiver or transceiver comprised in the radar level gauge. Based on the transmitted and reflected signals, the distance to the surface of the product can be determined. More particularly, the distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity of the electromagnetic signals.

The growing natural gas market is leading to a large supply of natural gas to be used as a lower emission feedstock alternative in power plants, refining/petrochemical plants and in the chemical industry. Moreover, the growing market is driving the need for reliable level measurements on liquified natural gases.

Level measurements with guided wave radar provides reliable and robust measurements on liquified gases as a seal between the level gauge and the tank can be designed to have cryogenic ratings and probe end projection can be used as a redundant level measurement even in extremely low dielectric liquids. However, a drawback making it difficult to use GWR for some liquid gas applications is the common safety requirement for a valve that can seal off the process from the measuring instrument. Accordingly, in applications where a ball valve has been required, a viable option is to use non-contacting radar (NCR) where the measurement signal can be emitted through the open valve.

It is however desirable to find solutions enabling the use of guided wave radar also for liquid natural gas applications fulfilling the above described requirements.

SUMMARY

In view of above-mentioned and other drawbacks of the prior art, it is an object of the present invention to provide a valve arrangement for a guided wave radar level gauge which allows for measurement through the valve when the valve is in an open position.

According to a first aspect of the invention, there is provided a valve arrangement for a guided wave radar level gauge comprising: a valve housing holding a movable valve element having a through-opening, the movable valve element being configured to be movable between an open position and a closed position; a probe section arranged in the through-opening of the movable valve element; upper and lower probe sections located on respective sides of the movable valve element; and a spring-loaded connection assembly configured to form an electrical connection between the upper and the lower probe section via the probe section in the movable valve element when the movable valve element is in an open position.

The described valve arrangement is configured to be used in a guided wave radar (GWR) level gauge application where a probe is extending into a container, tank or vessel holding a material such a liquid natural gas. A transceiver and its associated control circuitry is connected to the upper probe section, and the lower probe section is connected to the part of the probe which is extending into the tank. By means of the described valve arrangement, an unbroken conductive path can be formed for the measurement signal when the valve is in an open position. Moreover, when the valve is closed, the tank is sealed from the external environment which may be required to fulfill certain safety requirements, and which also simplifies service and replacement of the radar level gauge.

Accordingly, the present invention enables the use of a guided wave radar level gauge in applications where a valve for sealing the tank is required.

The movable valve element may be manually controllable by means of a lever or the like or it may be an automatic control valve controlled by a motor. The probe section in the through-opening of the movable valve element is configured to form an unbroken propagation path for a microwave signal from the upper probe section, through the valve and further on to the lower probe section and into the tank.

The spring-loaded connection assembly ensures that a reliable electrical contact is formed between the probe section located in the through opening of the valve and the respective upper and lower probe sections. Examples of the spring-loaded connection assembly will be given in the following description. However, it should be noted that many different variations of the described embodiments are possible.

According to one embodiment of the invention, the spring loaded connection assembly comprises first and second spring loaded probe elements arranged in the valve housing on respective sides of the movable valve element such that the first and second spring-loaded probe elements are pressed against and make contact with the probe section in the movable valve element when the movable valve element is in an open position, thereby forming a probe acting as a continuous transmission line through the valve arrangement. The spring-loaded probe elements are thus configured so that a force is applied in the axial direction between the respective first and second spring loaded probe element and the probe section located therebetween. Due to the force applied by the spring in the spring-loaded elements, the probe element is pressed against the probe section in the valve to thereby form a reliable contact which can be ensured even if the valve is frequently opened and closed.

According to one embodiment of the invention, the movable valve element further comprises a spacer arranged to hold the probe section in the through opening, wherein the spacer is partially hollow to allow a fluid flow through the movable valve element. The spacer is made from a non-conductive material and is configured to maintain the probe section in a central location in the opening and also to prevent the spacer from moving in an axial direction. The diameter of the through-opening is thereby larger than the diameter of the probe section. Furthermore, since the spacer comprises openings allowing a fluid connection through the valve when the valve is in an open position, there is no need for a fluid flow within the probe. Even though there may not be a flow through the valve as a part of any process, it may still be desirable to provide a fluid connection through the valve, for example when a pressure sensor is located in the valve arrangement above the valve. The fluid flow may thus be a gaseous flow through the spacer allowing the pressure in the tank to be measured at a location above the valve. A further advantage of the valve arrangement is thereby that the pressure sensor can be accessed without interrupting the process in the tank.

According to one embodiment of the invention, the probe section in the through-opening may comprise a first and second probe part configured to be threaded together in the through opening of the movable probe element. The described configuration of threaded probe parts may simplify manufacturing and assembly of the movable valve element, and the probe can also be configured to be attached to the movable valve element by means of a suitable abutment in a spacer holding the probe section.

According to one embodiment of the invention, each of the first and second spring loaded probe elements may comprise an inner probe section and an outer probe section wherein the inner probe section is partially arranged within the outer probe section and wherein the inner and outer probe sections are movable in relation to each other in an axial direction. Thereby, the axial force forming the connection between the spring-loaded probe element and the probe section of the movable valve element can be applied through a relative motion of the inner and outer probe section.

According to one embodiment of the invention each of the first and second spring-loaded probe elements comprises: an inner probe section; an outer hollow probe section; a coil spring at least partially arranged to exert a force between the inner and outer probe sections in an axial direction; a contact element attached to an end portion of the inner probe section and configured to form a contact to the probe section of the movable valve element. The described spring-loaded probe elements provide a reliable mechanical and electrical connection where a coil spring is used to apply an axial force to a contact element which in turn presses against the probe section.

According to one embodiment of the invention, the valve arrangement further comprises a contacting element configured to form a sliding contact between the inner and outer probe sections. The contacting element may for example comprise a flexible conductive member attached to the outer hollow probe section and configured exert a force on the inner probe section to form a sliding contact between the inner and outer probe sections. Thereby, a reliable electrical contact can be formed between inner and outer probe sections.

According to one embodiment of the invention, the outer hollow probe section may comprise at least one opening in a sidewall, wherein the flexible conductive member is arranged to form a contact with the inner probe section through the opening. The opening ensures that the flexible conductive member forms contact at the expected location between the outer and inner probe sections and does not slide out of place According to one embodiment of the invention, the valve arrangement may further comprise spacer elements arranged in the valve housing and configured to hold the spring-loaded probe elements. The spacers are advantageously configured to both ensure that the spring-loaded probe elements are fixed and centered within the valve housing and so that a fluid flow through the spacers is allowed.

According to one embodiment of the invention, each of the first and second spring loaded probe elements may comprise a curved or hemispherical end portion configured to form a mechanical and electrical contact to the probe section arranged in the through-opening of the movable valve element. For a probe having the shape of a hollow tube, a reliable contact can be achieved by using an end portion having a curved shape in the form of e.g. a hemisphere so that the end portion is automatically guided into the correct position by the axial force applied by the spring even if there is some initial misalignment between the end portion and the probe section in the movable valve element.

According to one embodiment of the invention, the spring loaded connection assembly comprises a spring-loaded probe element arranged in the through opening of the movable valve element such that the spring loaded probe element is pressed against and make contact with the upper and lower probe sections when the movable valve element is in an open position, to form a probe acting as a transmission line through the valve arrangement. Accordingly, the above described spring-loaded probe element may also be arranged within the movable valve element. Depending on the type of spring-loaded probe element used and on the size of the valve, different implementations may be advantageous for different applications. An advantage of arranging the spring-loaded probe element in the through opening of the movable valve element is that there would only be minor modifications to the parts of the probe outside of the movable valve element, which may simplify e.g. manufacturing and installation.

According to one embodiment of the invention, the movable valve element is a ball of a ball valve. Even though ball valves are most commonly used for the described tanks, the movable valve element may in principle also be a cylinder, a slidable element and the like.

According to one embodiment of the invention, the valve arrangement may further comprising a transceiver configured to provide a transmit signal, Tx-signal, to be propagated along the probe and to receive a reflected signal, Rx-signal, resulting from a reflection of the transmit signal at a surface of the product; and control circuitry configured to determine the fill level based on the received reflected signal. Thereby, a complete radar level gauge system can be provided which can be connected to a tank and to a probe arranged in the tank.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the valve arrangement according to the present invention are mainly described with reference to a guided wave radar level gauge installed in a tank located on land. However, the described system and method is suitable for use in other areas such as in marine applications. Moreover, various embodiments of the present invention are mainly discussed with reference to a pulsed radar level gauge system with a signal propagation device in the form of a single lead probe, and wireless communication capabilities.

It should be noted that this by no means limits the scope of the present invention, which also covers a pulsed radar level gauge system with another type of signal guiding device, as well as a pulsed radar level gauge system configured for wired communication, for example using a 4-20 mA current loop and/or other wired means for communication.

Figure 1A:
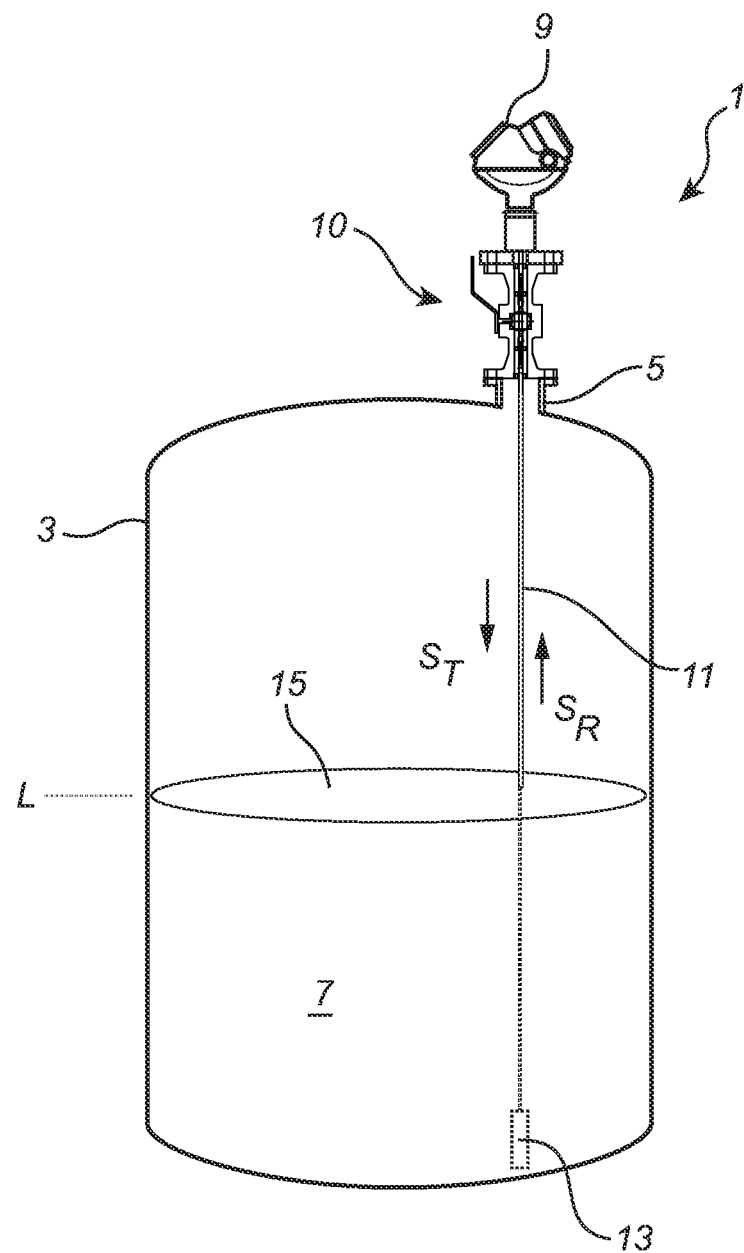
FIGS. 1A-B schematically illustrates an exemplary tank arrangement comprising a guided wave radar level gauge system according to an embodiment of the present invention.

FIG. 1A schematically illustrates an exemplary radar level gauge system 1 of GWR (Guided Wave Radar) type installed at a tank 3 having a tubular mounting structure 5 (often referred to as a "nozzle") extending substantially vertically from the roof of the tank 3. A valve arrangement 10 is connected to the nozzle 5 of the tank 3.

The guided wave radar level gauge system 1 is installed to measure the filling level of a product 7 in the tank 3. The radar level gauge system 1 comprises a measuring unit 9 and a propagation device, here in the form of a single conductor probe 11 extending from the measuring unit 9, through the valve arrangement 10 and the tubular mounting structure 5, towards and into the product 7 in the tank 3. In the example embodiment in FIG. 1A, the single conductor probe 11 is a wire probe, that has a weight 13 attached at the end thereof to keep the wire straight and vertical. The probe 11 may also be attached to the bottom of the tank. However, the probe may equally well by any other type of probe suitable for guided wave radar applications.

By analyzing a transmitted signal $S_T$ being guided by the probe 11 towards the surface 15 of the product 7, and a reflection signal $S_R$ traveling back from the surface 15, the measurement unit 9 can determine the filling level L of the product 7 in the tank 3. It should be noted that, although a tank 3 containing a single product 7 is discussed herein, the distance to any material interface along the probe can be measured in a similar manner.

The radar level gauge system in FIG. 1A will now be described in more detail with reference to the schematic block diagram in FIG. 1B. Referring to the schematic block diagram in FIG. 1B, the measurement unit 9 of the exemplary radar level gauge system 1 in FIG. 1A comprises a transceiver (Tx/Rx) 17, measurement control circuitry, here labeled as a measurement control unit (MCU) 19, a wireless communication control unit (WCU) 21, a communication antenna 23, and an energy store, such as a battery 25.

Figure 1B:
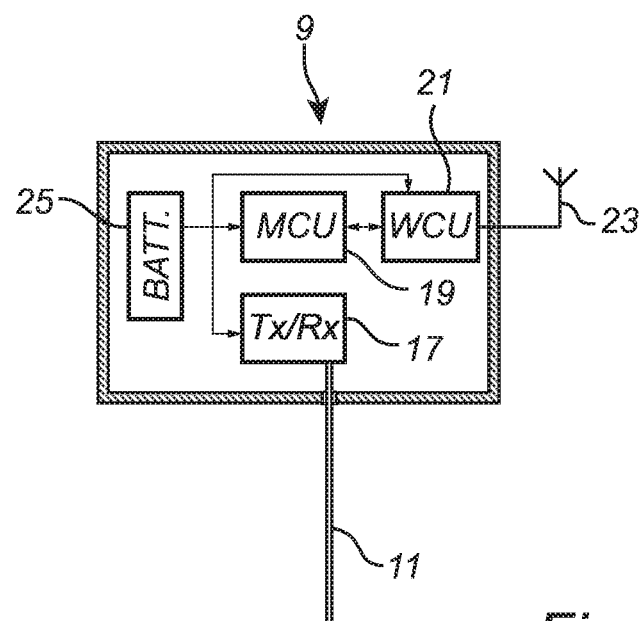

As is schematically illustrated in FIG. 1B, the MCU 19 controls the transceiver 17 to generate, transmit and receive electromagnetic signals. The transmitted signals pass through a feed-through to the probe 11, and the received signals pass from the probe 11 through the feed-through to the transceiver 17.

The MCU 19 determines the filling level L of the product 7 in the tank 3 and provides a value indicative of the filling level to an external device, such as a control center, from the MCU 19 via the WCU 21 through the communication antenna 23. The radar level gauge system 1 may advantageously be configured according to the so-called WirelessHART communication protocol (IEC 62591).

Although the measurement unit 9 is shown to comprise an energy store (battery 25) and to comprise devices (such as the WCU 21 and the communication antenna 23) for allowing wireless communication, it should be understood that power supply and communication may be provided in a different way, such as through communication lines (for example 4-20 mA lines).

The local energy store 25 need not (only) comprise a battery, but may alternatively, or in combination, comprise a capacitor or super-capacitor.

Moreover, the measurement control unit (MCU) 19 may more generally be referred to as control circuitry 19, and the control circuitry 19 may include a microprocessor, microcontroller, programmable digital signal processor or another programmable device. The control circuitry may also, or instead, include an application specific integrated circuit, a programmable gate array or programmable array logic, a programmable logic device, or a digital signal processor. Where the control circuitry includes a programmable device such as the microprocessor, microcontroller or programmable digital signal processor mentioned above, the processor may further include computer executable code that controls operation of the programmable device.

Figure 2:
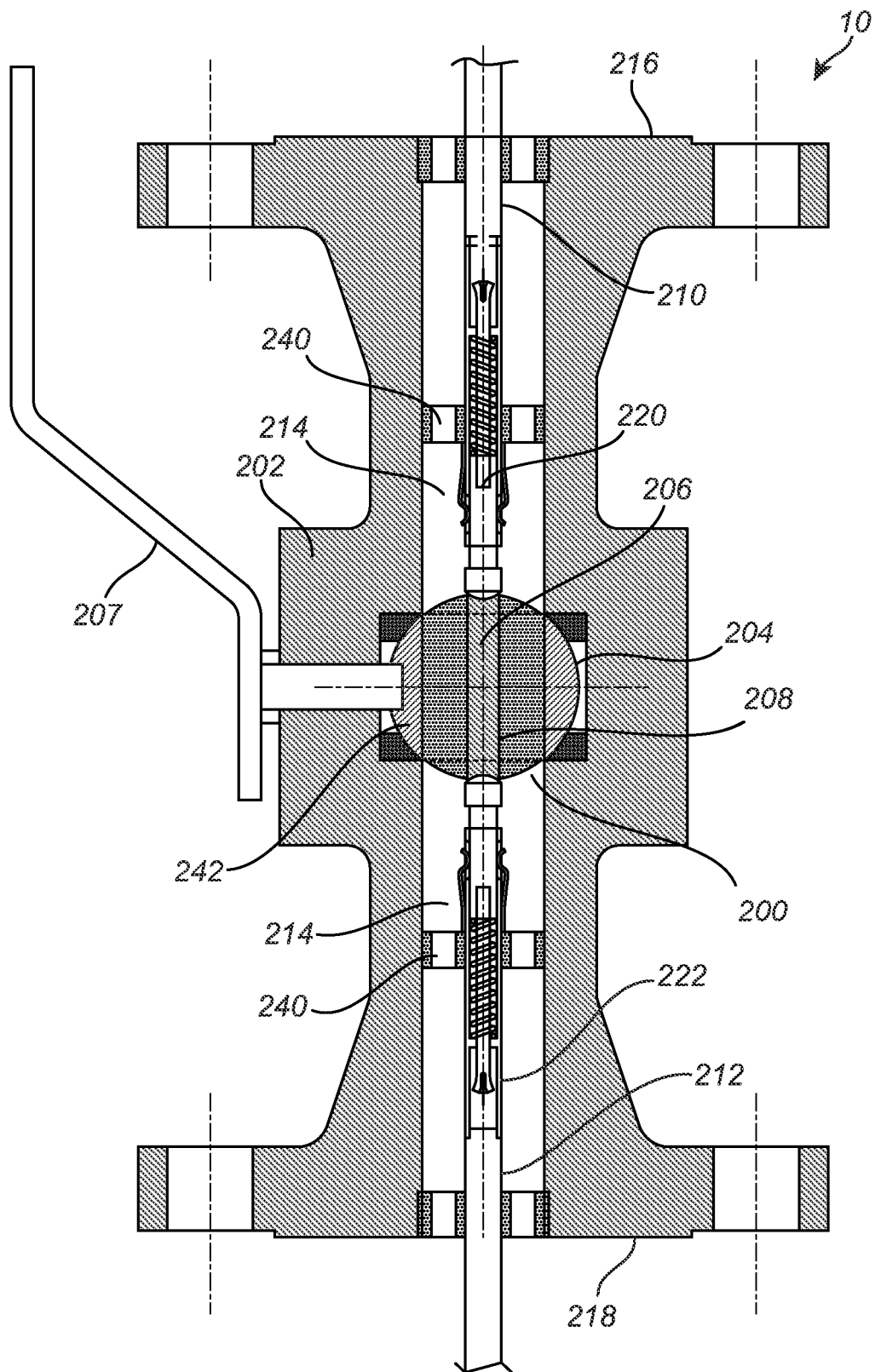
FIG. 2 is schematic illustration of a valve arrangement according to an embodiment of the invention.

FIG. 2 schematically illustrates a valve arrangement 10 for a guided wave radar level gauge 1 according to an embodiment of the invention where the valve 200 is illustrated as a ball valve 200 and the movable valve element 204 is thus the ball 204 of the ball valve 200.

Figures 3A, 3B:
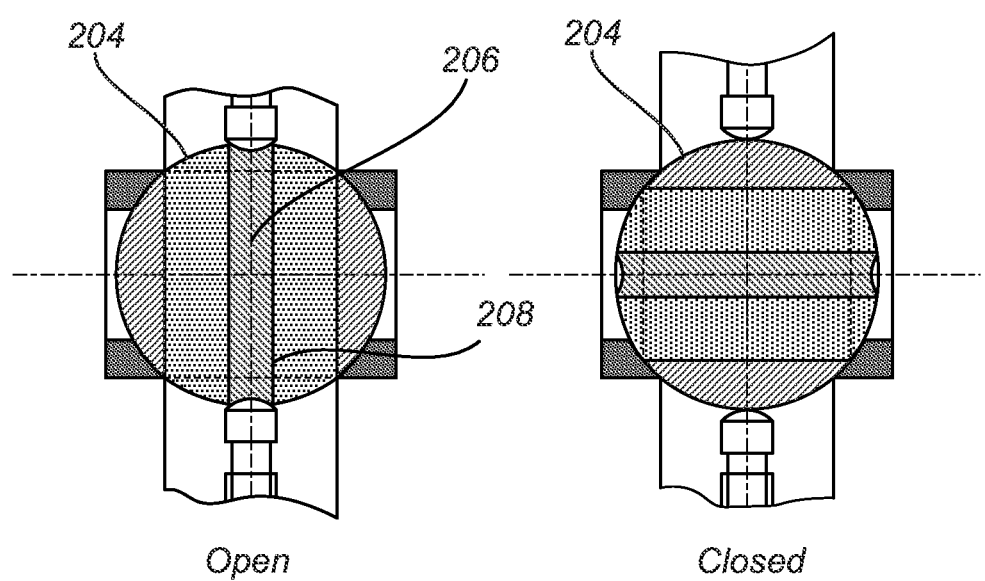
FIGS. 3A-B are schematic illustrations the valve arrangement according to an embodiment of the invention in open and closed positions.

The valve arrangement 10 comprises a valve housing 202 holding a movable valve element 204 having a through-opening 206. The movable valve element 204 is configured to be movable between an open position and a closed position as illustrated in FIGS. 3A and 3B, respectively, by means of a lever 207. The valve arrangement 10 further comprises a probe section 208 arranged in the through-opening 206 of the movable valve element 204 and upper and lower probe sections 210, 212 located on respective sides of the movable valve element 204.

Moreover, the valve arrangement 10 comprises a spring-loaded connection assembly 214 configured to form an electrical connection between the upper probe section 210 and the lower probe section 212 via the probe section 208 in the movable valve element 204 when the movable valve element 204 is in an open position as illustrated in FIG. 3A. When the valve 200 is in a closed position as illustrated in FIG. 3B, the tank is sealed and there is no fluid connection between the tank and an upper portion of the valve arrangement 10.

An example embodiment of the spring-loaded connection assembly 214 will be described in greater detail in the following. The probe section 208 arranged in the through-opening 206 may consist of two portions (not shown) which are inserted into the through-opening 206 from opposite sides and threaded together. Moreover, the spacer 242 of the movable valve element 204 may comprise a seat or groove and the probe section 208 may comprise a corresponding flange or protrusion to prevent the probe section 208 from moving in the through-opening after it has been assembled.

The illustrated valve arrangement 10 comprises an upper flange 216 for connecting the measuring unit 9 to the valve arrangement 10 to and a lower flange 218 for connecting the valve arrangement 10 to the tank 3.

Figure 4:
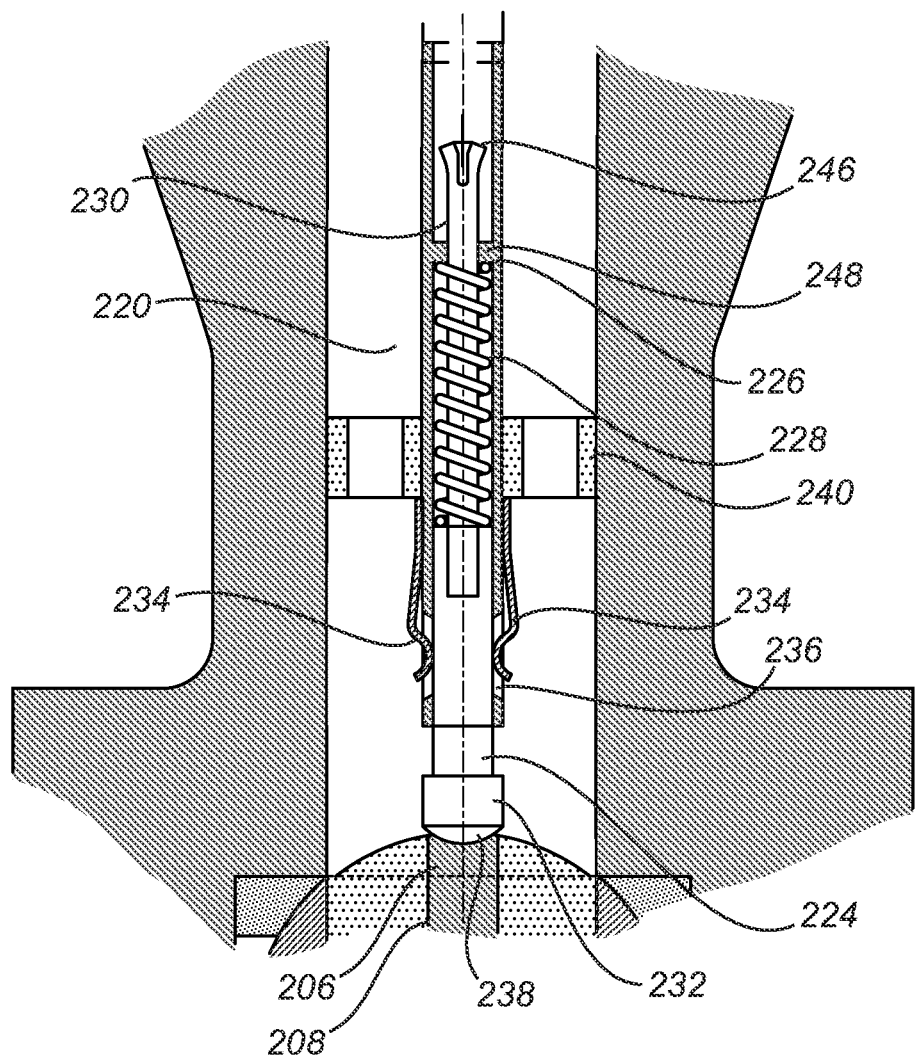
FIG. 4 is schematic illustration of a detail of a valve arrangement according to an embodiment of the invention.

The spring-loaded connection assembly 214 will be described with further reference to FIG. 4 illustrating a spring-loaded probe element 220 of one side of such an assembly 214, and it can be seen in FIG. 2 that the example spring-loaded connection assembly 214 comprises two spring-loaded probe elements 220, 222, one on each side of the movable valve element 204 such that the first and second spring-loaded probe elements 220, 222 are pressed against and made to make contact with the probe section 208 in the movable valve element 204 when the movable valve element 204 is in the open position, thereby forming a conductive path electrically connecting the upper probe section 210 to the lower probe section 212.

Accordingly, a probe acting as a continuous transmission line through the valve arrangement 10 is formed. Preferably, the probe has substantially the same diameter throughout the whole of the valve arrangement 10. When the valve is closed, the spring-loaded probe elements 220, 222 are only in contact with the outer surface of the movable valve element 204 and there is no electrical connection path though the movable valve element 204. The illustrated embodiment comprises a single lead probe 11. However, the described valve arrangement may equally well be used with other types of probes such as a co-axial probe, wire probe, flexible probe, twin conductor probe and the like.

As illustrated in FIG. 4, the spring-loaded probe element 220 comprises an inner probe section 224 and an outer hollow probe section 226, wherein the inner probe 224 section is partially arranged within the outer probe section 226 and wherein the inner and outer probe sections 224, 226 are movable in relation to each other in an axial direction, where the axial direction is along the length direction of the probe 11. The spring-loaded probe element 220 further comprises a coil spring 228 arranged to exert a force between the inner and outer probe sections 224, 226 in an axial direction, i.e. in the length-direction of the probe. In the present example, the coil spring 228 is arranged around a rod 230 which is connected to the inner probe section 224. However, the skilled person readily realizes that many different configurations of the coil spring 228 are feasible. The rod 230 and thereby the inner probe section 224 is prevented from extending too far by means of the top portion 246 of the rod 230 having a larger diameter than an internal opening inner probe section 224 formed by a flange 248 or protrusion as illustrated in FIG. 4.

Furthermore, the inner probe section 224 comprises a contact element 232 attached to an end portion, or forming the end portion, of the inner probe section 224 and the contact element 232 is configured to form an electrical and mechanical contact between the inner probe section 224 and the probe section 208 of the movable valve element 204.

The illustrated contact element 232 comprises a curved end portion 238 which enables the contact element to automatically align with the hollow probe section 206 of the valve ball 204. The curved end portion 238 in the described embodiment is substantially hemispherical but it may also have other shapes while still achieving the same effect. By means of the described arrangement with a curved end portion 238, the inner probe section 224 can easily be pressed upwards (thereby compressing the coil spring 228) when the movable valve element 204 is rotated to a closed position as illustrated in FIG. 3B.

The spring-loaded connection assembly 214 further comprises one or more contacting elements 234 configured to form a sliding contact between the inner and outer probe sections 224, 226. The contacting element 234 comprises a flexible conductive member 234 attached to the outer hollow probe section 226 and configured exert a force on the inner probe section 224 in a direction perpendicular to the surface of the inner probe section 224, to form a sliding contact between the inner and outer probe sections 224, 226. Thereby, an electrical contact is formed so that the transmitted microwave signal can propagate unhindered between the inner and outer probe sections 224, 226. Moreover, the described sliding contact 234 allows the inner probe section 224 to move in an axial direction in relation to the outer probe section 226 without breaking the electrical contact between the inner and outer probe sections 224, 226 which increases the reliability of the electrical connection in applications where the valve arrangement 10 may move or vibrate. The described contacting element 234 can for example be an elastic fingerlike structure which is pre-loaded so that it presses against the inner probe section 224 when it is located within the outer probe section 226.

Furthermore, the illustrated outer probe section 226 comprises at least one opening 236 in a sidewall thereof, wherein the flexible conductive member 234 is arranged to form the electrical and mechanical contact with the inner probe section 224 through the opening 236.

Figure 5:
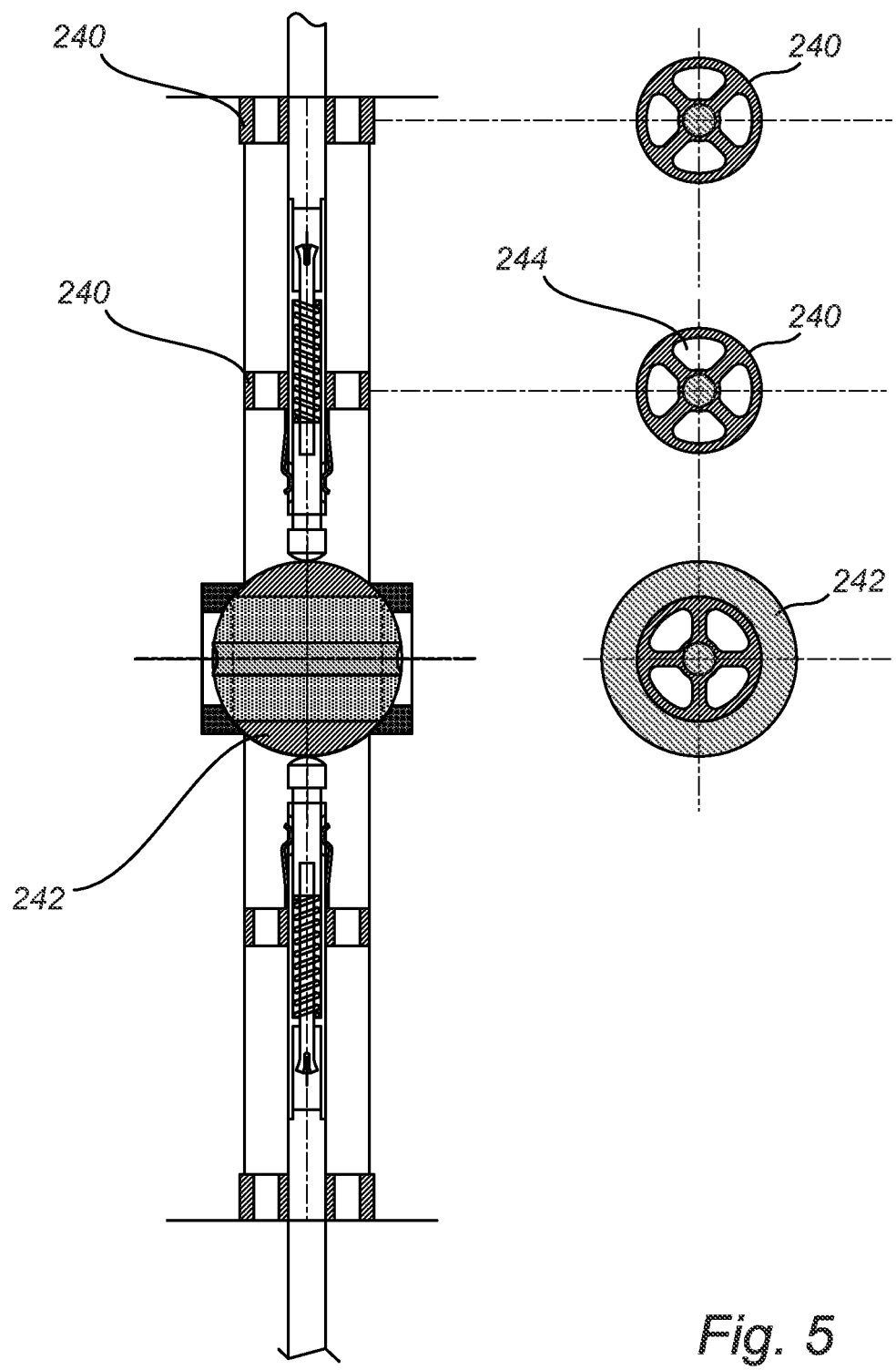
FIG. 5 is schematic illustration of a detail of a valve arrangement according to an embodiment of the invention.

As illustrated in FIG. 4 and further clarified in FIG. 5, the spring-loaded probe elements 220, 222 are held in place by spacers 240 attached to the side walls of the valve housing 202. The spacers comprise a plurality of openings 244 forming a fluid connection through the spacers.

FIG. 5 further illustrates the spacer 242 of the movable valve element arranged to hold the probe section in the through opening. The spacer 242 of the movable valve element 204 is also partially hollow to allow a fluid flow through the movable valve element 204. The spacers 240, 242 are non-conductive and may for example be made from a ceramic or plastic material.

Even though the invention has been described with reference to specific exemplifying embodiments thereof, many different alterations, modifications and the like will become apparent for those skilled in the art. Also, it should be noted that parts of the system and method may be omitted, interchanged or arranged in various ways, the system and method yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A valve arrangement for a guided wave radar level gauge comprising:

a valve housing holding a movable valve element having a through-opening, the movable valve element being configured to be movable between an open position and a closed position;

a probe section arranged in the through-opening of the movable valve element;

upper and lower probe sections located on respective sides of the movable valve element; and a spring-loaded connection assembly configured to form an electrical connection between the upper and the lower probe section via the probe section in the movable valve element when the movable valve element is in an open position.

2. The valve arrangement according to claim 1, wherein the spring loaded connection assembly comprises first and second spring loaded probe elements arranged in the valve housing on respective sides of the movable valve element such that the first and second spring-loaded probe elements are pressed against and make contact with the probe section in the movable valve element when the movable valve element is in an open position, to form a probe acting as a transmission line through the valve arrangement.

3. The valve arrangement according to claim 1, wherein the movable valve element further comprises a spacer arranged to hold the probe section in the through opening, wherein the spacer is partially hollow to allow a fluid flow through the movable valve element.

4. The valve arrangement according to claim 1, wherein the probe section in the through opening comprises a first and second probe part configured to be threaded together in the through opening of the movable probe element.

5. The valve arrangement according to claim 2, wherein each of the first and second spring loaded probe elements comprises:

an inner probe section and an outer probe section wherein the inner probe section is partially arranged within the outer probe section and wherein the inner and outer probe sections are movable in relation to each other in an axial direction.

6. The valve arrangement according to claim 5, wherein each of the first and second spring loaded probe elements comprises:

an inner probe section;

an outer hollow probe section;

a coil spring arranged to exert a force between the inner and outer hollow probe sections in an axial direction;

a contact element attached to an end portion of the inner probe section and configured to form a contact between the inner probe section and the probe section of the movable valve element.

7. The valve arrangement according to claim 6, further comprising a contacting element configured to form a sliding contact between the inner and outer hollow probe sections.

8. The valve arrangement according to claim 7, wherein the contacting element comprises a flexible conductive member attached to the outer hollow probe section and configured exert a force on the inner probe section to form a sliding contact between the inner and outer probe sections.

9. The valve arrangement according to claim 8, wherein the outer hollow probe section comprises at least one opening in a sidewall, wherein the flexible conductive member is arranged to form a contact with the inner probe section through the opening.

10. The valve arrangement according to claim 1, further comprising at least one spacer element arranged in the valve housing and configured to hold the spring-loaded probe elements.

11. The valve arrangement according to claim 2, wherein each of the first and second spring loaded probe elements comprises a curved end portion configured to form a mechanical and electrical contact to the probe section arranged in the through-opening of the movable valve element.

12. The valve arrangement according to claim 1, wherein the spring loaded connection assembly comprises a spring loaded probe element arranged in the through opening of the movable valve element such that the spring loaded probe element is pressed against and make contact with the upper and lower probe sections when the movable valve element is in an open position, to form a probe acting as a transmission line through the valve arrangement.

13. The valve arrangement according to claim 1, wherein the movable valve element is a ball of a ball valve.

14. The valve arrangement according to claim 1, wherein the movable valve element is cylindrical.

15. The valve arrangement according to claim 1, further comprising a transceiver configured to provide a transmit signal, $S_T$, to be propagated along the probe and to receive a reflected signal, $S_R$, resulting from a reflection of the transmit signal at a surface of the product; and control circuitry configured to determine the fill level based on the received reflected signal.

\* \* \* \* \*